United States Patent [19]

Shimizu et al.

[11] 4,293,445

[45] Oct. 6, 1981

[54] METHOD FOR PRODUCTION OF MOLDED PRODUCT CONTAINING TITANIUM OXIDE

[75] Inventors: Shinkichi Shimizu; Tadao Nishizaki, both of Niihama; Masabumi Tsuda, Takarazuka, all of Japan

[73] Assignee: Sumitomo Chemical Company, Limited, Osaka, Japan

[21] Appl. No.: 109,322

[22] Filed: Jan. 3, 1980

[51] Int. Cl.$^3$ .................. B01J 27/24; B01J 27/06; B01J 21/00; B01J 21/10
[52] U.S. Cl. .................. 252/438; 252/441; 252/461; 252/475; 423/213.2; 423/213.5; 562/480
[58] Field of Search ............ 252/438, 441, 475, 461

[56] References Cited

U.S. PATENT DOCUMENTS

| | | | |
|---|---|---|---|
| 3,737,491 | 6/1973 | Stander et al. | 252/475 X |
| 4,207,209 | 6/1980 | Matsuda et al. | 252/462 |
| 4,221,768 | 9/1980 | Inoue et al. | 252/462 X |

*Primary Examiner*—Delbert E. Gantz
*Assistant Examiner*—William G. Wright
*Attorney, Agent, or Firm*—Birch, Stewart, Kolasch and Birch

[57] ABSTRACT

A method for the production of a molded product containing titanium oxide, which comprises molding a titanium oxide composition containing a barium compound in the atomic ratio of titanium:barium=100:0.1 to 20. The resulting molded product has excellent strength and is useful, for example, as a catalyst carrier or catalyst, in various shapes such as pellet, bar, ring, sphere, or the like.

4 Claims, No Drawings

METHOD FOR PRODUCTION OF MOLDED PRODUCT CONTAINING TITANIUM OXIDE

The present invention relates to a method for the production of a molded product containing titanium oxide. More particularly, it relates to a method for the production of a molded product having a large strength which comprises titanium oxide and other catalytically active components or a catalyst carrier.

Catalyst carriers or catalysts are usually used in various forms such as pellet, bar, ring, sphere, honeycomb or other shapes which are packed in a reactor of a fixed bed, moving bed, fluidizing bed, or the like, but these catalyst carriers and catalysts should have a large strength in order to use them one a commercial scale, because the products having a large strength can be used without collapse or abrasion during packing in or removing from the reactor in the form of pellet, bar, ring, or other shapes.

When the catalyst carriers or catalysts have a small strength, they are easily collapsed or abraded during the use thereof, which results unfavorably in closing of the reactor. Besides, when they are packed in a reactor of a moving bed or fluidizing bed, they can not be used in the form of pellet, bar or ring due to the abrasion and hence are usually used in the form of a sphere.

It is known that titanium oxide is useful as a catalyst carrier or a catalytic active component, and that vanadium oxide-titanium oxide composition is useful as a catalyst for synthesis of phthalic acid, and a transition metal oxide-titanium oxide composition is useful as a catalyst for the removal of nitrogen oxides.

However, these catalyst carriers or catalysts comprising a titanium oxide composition are unfavorably inferior in mechanical strength, contrary to the conventional molded products of alumina.

As a result of intensive study of the present inventors, it has been found that the mechanical strength of the molded product of a titanium oxide composition can significantly be improved by incorporating a barium compound to the titanium oxide composition.

An object of the present invention is to provide an improved molded product containing titanium oxide. Another object of the invention is to improve the mechanical strength of a molded product containing titanium oxide. A further object of the invention is to provide a method for the production of a molded product having great strength comprising a titanium oxide composition, such as a catalyst carrier or catalyst containing titanium oxide. A still further object of the invention is to provide a method for molding a titanium oxide composition. These and other objects and advantages of the invention will be apparent to persons skilled in the art from the following description.

The molded product having great strength of the present invention can be prepared by molding a titanium oxide composition which contains titanium oxide and a barium compound in the atomic ratio of titanium:barium = 100:0.1 to 20.

The titanium oxide composition may essentially consist of titanium oxide alone or comprises titanium oxide with any other inorganic substance. In any event, the titanium oxide comprises titanium oxide in an amount of not less than about 50% by weight based on the weight of the titanium oxide composition. Other inorganic substances include as a catalytically active substance a complex, salt or oxide of a metal such as vanadium, tungsten, molybdenum, chromium, iron, copper, cerium or tin, and further include as a catalytically inactive substance alumina, diatomaceous earth, bentonite, etc. Further, the titanium oxide composition may be incorporated with titanic acid, metatitanic acid, and other similar materials.

The titanium oxide composition is preferably used in the form of a wet cake or a dried cake, and is more preferably used after calcining the cake at a temperature of 300° to 1,000° C., preferebly 300° to 800° C., and pulverizing the resultant product with a vibrating ball mill or the like to give a fine powder.

Heretofore, when titanium oxide obtained by the sulfate process for the production of titanium oxide was used, the remaining sulfate had a bad effect on the improvement of the mechanical strength of the molded product. According to the method of the present invention, however, even when sulfate remains in the starting titanium oxide, the sulfate is fixed in the form of barium sulfate by the addition of a barium compound, and thereby, the obstacle due to the sulfate is eliminated.

The barium compound used in the present invention includes barium chloride, barium nitrate, barium nitrite, barium perchlorate, or the like. The barium compound is usually used in an amount of 0.1 to 20 atoms (as a barium atom) per 100 atoms of titanium contained in the titanium oxide composition. When the barium compound is used in an amount of less than 0.1 atom per 100 atoms of titanium, the molded product obtained has unfavorably an inferior strength, and on the other hand, when the amount of the barium compound is larger than 20 atoms, the molded product has unfavorably an inferior catalytic activity and also too large a specific weight.

The titanium oxide composition is mixed with the barium compound in the dried state or in the form of a suspension or slurry in a medium or a solution in an aqueous medium.

The mixture of the titanium oxide composition, barium compound and other additives may be formed into the desired molded product by treating the mixture with a tabletting machine in the powdery state, but preferably, the mixture are mixed with an aqueous medium of 10 to 60% by weight, preferably 20 to 35% by weight, based on the weight of the mixture (in dry state), and are uniformly kneaded with a kneader, and then the mixture is molded with an extruder and the resulting product is cut with a cutter into an appropriate size. Alternatively, the product formed by the extrusion molding is cut, and the cut product is packed into a tumbling granulator or a spheronizing comminutor (e.g. Marumerizer) to form a spherical product. The spherical product thus obtained may further be coated with an additional titanium oxide composition and aqueous medium wherein the aqueous medium is used in an amount of not more than 30% by weight based on the weight of the titanium oxide composition, and the mixture is further granulated with a rolling granulator or centrifugal fluidizing coating granulator to form a spherical product having a larger size.

When the mixture used in the extrusion molding with an extruder contains lower than 10% by weight of aqueous medium, it can substantially not be extruded, and on the other hand, when the mixture contains more than 60% by weight of aqueous medium, it can be extruded but the extruded product tends to become hollow during the subsequent granulating step, and hence, the final product has an inferior mechanical strength. Besides, when the aqueous medium added together with the titanium oxide composition to the spherical product in order to further granulate is used in an amount of more than 30% by weight, the granules obtained have uneven denseness and the spherical product has voids within the sphere, and hence, the spherical product having a larger size shows an inferior mechanical strength.

The aqueous medium used in the present invention includes water, an aqueous solution of salts (e.g. ammonium nitrate), acids (e.g. nitric acid), ammonia or amines (e.g. methylamine), to which any organic or inorganic binder (e.g. polyvinyl alcohol) may be added. The salts, acids, ammonia, amines and other organic or inorganic substances added to water act as a lubricant for the extrusion molding, as a binder for the formed spherical product, or as a sintering agent for the calcination.

The molded products thus obtained may optionally be dried and calcined. The calcination may be carried out at various temperatures depending upon the variation of components of the composition and utilities of the products, but is usually carried out at a temperature of not higher than 1,000° C., preferably within the range of 300° to 800° C. For instance, when a vanadium oxide-titanium oxide catalyst useful for the removal of nitrogen oxides is prepared, the calcination is preferably carried out at a temperature of 300° to 600° C. When the molded product consisting of titanium oxide is calcined at a temperature of 650° to 900° C., a transition from the anatase form to rutile form occurs together with sintering, which results in a small surface of the product. Such a product having a small surface is not suitable for a catalyst or catalyst carrier because of lower catalytic activity. The calcination period of time affects the properties and strength of the final product and is usually in the range of 1 to 10 hours. The molded product may also be used without calcination, that is, they may be packed in a reactor and used at a high reaction temperature, by which the same effect can be obtained as like as it is calcined.

The molded product containing titanium oxide obtained by the present invention has a sufficient strength and can be used on a commercial scale, and further has sufficient physical properties such as surface area and pore volume which are necessary for the use thereof as a catalyst carrier or catalyst. Particularly, the molded product has favorably an excellent abrasion resistance, less pressure loss and ease in handling.

The present invention will be illustrated by the following Examples but it is not intended to limit the invention thereto.

EXAMPLES 1 TO 4

To a titanium oxide composition (V/Ti=1/12 by atomic ratio) was added barium chloride in the ratio as shown in the following Table 1. The mixture was pulverized and molded with a tabletting machine to give tablets (diameter: 5 mm, height: 5 mm), and the tablets thus obtained were calcined at 500° C. for 5 hours. The crush strength of the molded products thus obtained was measured. The results are shown in Table 1.

TABLE 1

| Example No. | Titanium:Barium (atomic ratio) | Crush strength (kg.G) |
|---|---|---|
| 1 | 100:1.5 | 4.9 |
| 2 | 100:5 | 5.5 |
| 3 | 100:7 | 6.0 |

TABLE 1-continued

| Example No. | Titanium:Barium (atomic ratio) | Crush strength (kg.G) |
|---|---|---|
| 4 | 100:10 | 6.7 |

REFERENCE EXAMPLE 1

In the same manner as described in Example 1, the same titanium oxide composition as used in Example 1 was molded and calcined except that no barium compound was added. As a result, the molded product had a crush strength of 1.5 kg. G.

EXAMPLE 5 TO 7

To the same titanium oxide composition as used in Example 1 was added barium chloride in the ratio as shown in Table 2. To the mixture was added water (30% by weight, as an aqueous medium), and the mixture was kneaded well with a kneader to give a clay-like composition. The clay-like titanium oxide composition thus obtained was formed into a cylindrical molded product (diameter: 4 mm, height: 4 mm) with an extrusion molding machine and a cutter. The molded product was further formed into a sphere with a Marumerizer. The molded product thus obtained was dried at 150° C. for 3 hours and calcined at 400° C. for 8 hours. The crush strength of the product was measured. The results are shown in Table 2.

TABLE 2

| Example No. | Titanium:Barium (atomic ratio) | Crush strength (kg.G) |
|---|---|---|
| 5 | 100:1.5 | 7.0 |
| 6 | 100:5 | 7.7 |
| 7 | 100:7 | 8.5 |
| 8 | 100:10 | 9.8 |

REFERENCE EXAMPLE 2

Example 5 was repeated except that no barium compound was added. As a result, the molded product thus obtained had a crush strength of 5.8 kg. G.

EXAMPLES 8 TO 11

To the same titanium oxide composition as used in Example 1 was added barium chloride in the ratio as shown in Table 3. To the mixture was added water (30% by weight, as an aqueous medium), and the mixture was kneaded well with a kneader to give a clay-like composition. The clay-like titanium oxide composition thus obtained was formed into a cylindrical molded product (diameter: 3 mm, height: 3 mm) with an extrusion molding machine and a cutter. The molded product was further formed into a sphere with a Marumerizer.

In order to form an outer layer on the sphere (core) obtained above, to the sphere was added a titanium oxide composition and water (amount of water: 20% by weight based on the weight of the titanium oxide composition), by which the outer layer was formed to give a spherical molded product of titanium oxide composition. The molded product thus obtained was dried at 150° C. for 3 hours and calcined at 400° C. for 8 hours. The resulting molded product had an average diameter of 5.0 mm and a crush strength as shown in Table 3.

TABLE 3

| Example No. | Titanium:Barium (atomic ratio) | Crush strength (kg.G) |
|---|---|---|
| 8 | 100:1.5 | 8.4 |
| 9 | 100:5 | 10.4 |
| 10 | 100:7 | 11.5 |
| 11 | 100:10 | 12.9 |

REFERENCE EXAMPLE 3

Example 8 was repeated except that no barium compound was added. As a result, the molded product thus obtained had a crush strength of 7.6 kg. G.

EXAMPLE 12

Example 7 was repeated except that 1 N nitric acid was used as the aqueous medium. As a result, the molded product thus obtained had a crush strength of 10.1 kg. G.

REFERENCE EXAMPLE 4

Example 12 was repeated except that no barium chloride was added. As a result, the molded product thus obtained had a crush strength of 6.9 kg. G.

EXAMPLE 13

Example 10 was repeated except that 1 N nitric acid was used as the aqueous medium. As a result, the molded product thus obtained had a crush strength of 13.2 kg. G.

REFERENCE EXAMPLE 5

Example 13 was repeated except that no barium chloride was added. As a result, the molded product thus obtained had a crush strength of 8.7 kg. G.

EXAMPLE 14

Example 10 was repeated except that a 5% aqueous ammonia was used as the aqueous medium. As a result, the molded product thus obtained had a crush strength of 11.2 kg. G.

EXAMPLES 15 AND 16

Example 10 was repeated except that water (15% by weight, in Example 15) or water (50% by weight, in Example 16) was used as the aqueous medium. As a result, the molded products thus obtained had a crush strength of 11.1 kg. G and 11.3 kg. G, respectively.

EXAMPLES 17 AND 18

Example 10 was repeated except that barium nitrate was used as the barium compound and water (15% by weight, in Example 17) or water (50% by weight, in Example 18) was used as the aqueous medium. As a result, the molded products thus obtained had a crush strength of 11.0 kg. G and 11.5 kg. G, respectively.

EXAMPLES 19 TO 23

By using various kinds of barium compounds and various kinds and amounts of aqueous mediums as shown in Table 4, the molding of titanium oxide compositions were carried out under the conditions as shown in Table 4. As a result, the molded products thus obtained had a crush strength as shown in Table 4.

TABLE 4

| Example No. | Barium compound | Aqueous medium Kind | Amount (% by weight) | Conditions of molding and calcination | Crush strength (kg.G) |
|---|---|---|---|---|---|
| 19 | Barium chloride | 1N oxalic acid | 30 | The same as in Example 7 | 8.3 |
| 20 | Barium nitrate | 1N nitric acid | " | The same as in Example 7 | 8.5 |
| 21 | " | " | " | The same as in Example 10 | 11.1 |
| 22 | Barium chloride | 5% Methylamine | 25 | The same as in Example 10 | 10.9 |
| 23 | Barium acetate | 5% ammonia | " | The same as in Example 10 | 10.9 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a method for the production of a molded product containing titanium oxide by molding a titanium oxide composition the improvement which comprises molding said titanium oxide composition containing a barium compound in the atomic ratio of titanium:barium = 100:0.1 to 20, followed by calcining at a temperature of about 300° to 600° C.

2. A method according to claim 1, wherein the barium compound is a member selected from the group consisting of barium chloride, barium nitrate, barium nitrite, and barium perchlorate.

3. A method according to claim 1, wherein the titanium oxide composition comprises titanium oxide and a complex compound, salt or oxide of a metal selected from the group consisting of vanadium, tungsten, molybdenum, chromium, iron, copper, cerium and tin.

4. A molded product produced according to the method as set forth in claim 1, 2 or 3.

* * * * *